United States Patent
An et al.

(10) Patent No.: US 10,694,563 B2
(45) Date of Patent: Jun. 23, 2020

(54) USER TERMINAL, METHOD OF CONTROLLING SAME, AND SERVICE DEVICE

(71) Applicant: SK Planet Co., Ltd., Seoul (KR)

(72) Inventors: Eun Yeong An, Seoul (KR); Joon Sung Lee, Seongnam-si (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 16/128,987

(22) Filed: Sep. 12, 2018

(65) Prior Publication Data
US 2019/0090294 A1  Mar. 21, 2019

(30) Foreign Application Priority Data

Sep. 18, 2017  (KR) .................. 10-2017-0119528

(51) Int. Cl.
| | | |
|---|---|---|
| *H04W 76/16* | (2018.01) | |
| *H04W 76/14* | (2018.01) | |
| *H04W 88/04* | (2009.01) | |
| *H04B 7/15* | (2006.01) | |
| *H04W 4/80* | (2018.01) | |
| *H04W 8/24* | (2009.01) | |
| *H04W 4/70* | (2018.01) | |
| *H04B 7/26* | (2006.01) | |

(52) U.S. Cl.
CPC .............. *H04W 76/14* (2018.02); *H04B 7/15* (2013.01); *H04B 7/2606* (2013.01); *H04W 4/70* (2018.02); *H04W 4/80* (2018.02); *H04W 8/24* (2013.01); *H04W 88/04* (2013.01)

(58) Field of Classification Search
CPC ......... H04B 7/15; H04B 7/2606; H04W 4/70; H04W 4/80; H04W 8/24; H04W 76/14; H04W 88/04
See application file for complete search history.

(56) References Cited

U.S. PATENT DOCUMENTS

| | | | |
|---|---|---|---|
| 2010/0012715 A1* | 1/2010 | Williams ............... | G06Q 20/32 235/375 |
| 2010/0095026 A1* | 4/2010 | Nagai .................... | H04L 67/141 710/16 |
| 2016/0182459 A1* | 6/2016 | Britt ...................... | H04L 63/061 713/171 |
| 2016/0330182 A1* | 11/2016 | Jeon ...................... | H04L 63/062 |
| 2017/0090866 A1* | 3/2017 | Vaughn .................. | G06F 7/02 |
| 2017/0353981 A1* | 12/2017 | Lee ........................ | H04W 12/08 |
| 2018/0013761 A1* | 1/2018 | Bachar .................. | H04L 63/102 |
| 2018/0104484 A1* | 4/2018 | Ryaby .................... | A61N 1/326 |
| 2018/0176079 A1* | 6/2018 | Teo ......................... | H04L 29/08 |
| 2018/0176879 A1* | 6/2018 | Yoon ..................... | H04W 8/005 |
| 2019/0090294 A1* | 3/2019 | An ........................ | H04B 7/2606 |

* cited by examiner

*Primary Examiner* — Benjamin H Elliott, IV
(74) *Attorney, Agent, or Firm* — Fenwick & West LLP

(57) ABSTRACT

The present disclosure provides a user terminal, a method of operating the same, and a service device which can improve user convenience in using the service device by minimizing a user configuration process required for a pairing procedure between the user terminal and the service device via a wireless relay device.

11 Claims, 8 Drawing Sheets

USER TERMINAL, METHOD OF CONTROLLING SAME, AND SERVICE DEVICE

CROSS-REFERENCE TO RELATED APPLICATIONS

This application claims priority to Korean Patent Application No. 10-2017-0119528, filed on Sep. 18, 2017, the entire contents of which are incorporated herein by reference.

TECHNICAL FIELD

The present disclosure relates to a method of simplifying a pairing procedure between a user terminal and a service device via a wireless relay device.

BACKGROUND

Recently, service devices for simply and quickly providing service such as an IoT device has been introduced across various fields. For example, a purchase of product can be quickly and simply performed through pushing button of the IoT device, such that loyalty of customers is guaranteed and a new purchase experience is provided.

The service device is a device to provide users with convenience in common. But there is inconvenience of a pre-processing procedure such as pairing required for actually using the service device.

In order to use the service device, pairing between a user terminal with a relevant application and the service device should be processed via a wireless relay device (for example, an AP). In this procedure, a complicated user configuration process is required in the user terminal.

Therefore, it is required to minimize the user configuration process required for the pairing procedure between the user terminal and the service device in order to minimize the user inconvenience caused when the service device is used.

SUMMARY

The present disclosure has been made to solve the problem and an aspect of the present disclosure is to minimize a user configuration process required for a pairing procedure between a user terminal and a service device via a wireless relay device.

In one form of the present disclosure, a user terminal is provided. The user terminal includes: a processor configured to perform process for pairing with a service device; and a memory configured to store at least one instruction executed by the processor, wherein the at least one instruction includes: an identification instruction for identify whether the service device is located within a coverage of a wireless relay device through a predefined pattern signal; a delivery instruction for access information of the wireless relay device being delivered to the service device, when it is identified that the service device is located within the coverage; and a processing instruction for pairing with the service device when the service device receives the access information of the wireless relay device and accesses the wireless relay device.

Specifically, the identification instruction may transmit the pattern signal to the wireless relay device to allow the service device located within the coverage of the wireless relay device to recognize the pattern signal.

Specifically, the identification instruction may identify the service device located within the coverage of the wireless relay device when the pattern signal is received from the service device.

Specifically, the pattern signal may be defined to include a particular binary value repeated a predetermined number of times.

Specifically, the delivery instruction may transmit the access information of the wireless relay device to the wireless relay device, thereby the access information of the wireless relay device being delivered to the service device located within the coverage of the wireless relay device.

Specifically, the processing instruction may transmit a response message to a pairing message received from the service device accessing the wireless relay device, and processes pairing with the service device.

Specifically, the pairing message may be received from the service device in a unicast manner.

In accordance with another form of the present disclosure, a service device is provided. The service device includes: a processor configured to perform process for pairing with a user terminal; and a memory configured to store at least one instruction executed through the processor, wherein the at least one instruction includes: a transmission instruction for transmitting a pattern signal to be delivered to the user terminal when a predefined pattern signal is recognized within a coverage of a wireless relay device; an acquisition instruction for acquiring access information of the wireless relay device transmitted by the user terminal receiving the pattern signal; and a processing instruction for accessing the wireless relay device based on the access information of the wireless relay device to process pairing with the user terminal.

Specifically, the at least one instruction may further include a warning instruction for, when access to the wireless relay device is impossible based on the access information of the wireless relay device, providing a warning about the inaccessible state.

In accordance with another form of the present disclosure, a method of operating a user terminal is provided. The method includes: identifying whether the service device is located within a coverage of a wireless relay device through a predefined pattern signal; delivering access information of the wireless relay device to the service device, when it is identified that the service device is located within the coverage; and pairing with the service device when the service device receives the access information of the wireless relay device and accesses the wireless relay device.

Specifically, the identifying may comprise: transmitting the pattern signal to the wireless relay device to allow the service device located within the coverage of the wireless relay device to recognize the pattern signal.

Specifically, the identifying may further comprise: identifying the service device located within the coverage of the wireless relay device when the pattern signal is received from the service device.

Specifically, the pattern signal may be defined to include a particular binary value repeated a predetermined number of times.

Specifically, the delivering may comprise: transmitting the access information of the wireless relay device to the wireless relay device, thereby the access information of the wireless relay device being delivered to the service device located within the coverage of the wireless relay device.

Specifically, the processing may comprise: transmitting a response message to a pairing message received from the service device accessing the wireless relay device, and processes pairing with the service device.

Specifically, the pairing message may be received from the service device in a unicast manner.

Accordingly, through a user terminal, a method of operating the same, and a service device according to an embodiment of the present disclosure, it is possible to improve user convenience in using the service device by minimizing a user configuration process required for a pairing procedure between the user terminal and the service device via a wireless relay device.

DRAWINGS

The above and other aspects, features and advantages of the present disclosure will be more apparent from the following detailed description taken in conjunction with the accompanying drawings, in which:

FIG. 1 schematically illustrates the configuration of a pairing system in one form of the present disclosure;

DETAILED DESCRIPTION

Figure 1:
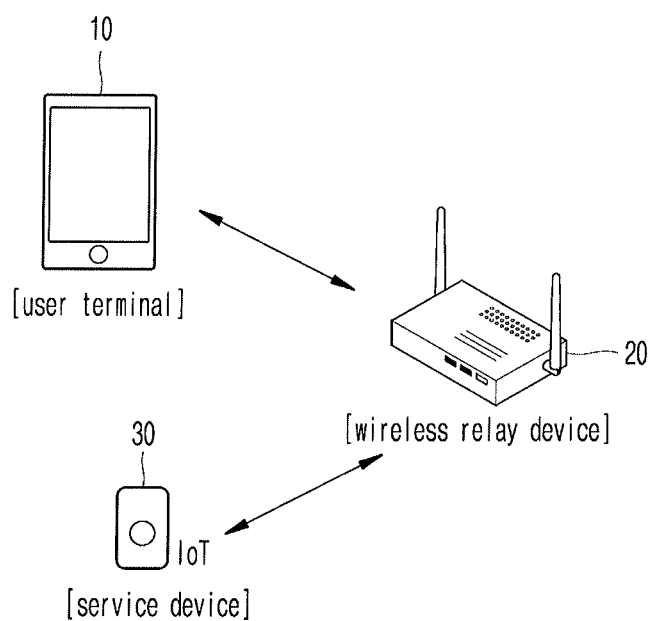

It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

Hereinafter, exemplary embodiments of the present disclosure will be described in detail with reference to the accompanying drawings, equal or similar elements are assigned an equal reference numeral, and an overlapping description thereof will be omitted. Further, in the following description of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the spirit of the present disclosure should not be construed as being limited by the accompanying drawings. In addition to the accompanying drawings, the spirit of the present disclosure should be construed to cover all modifications, equivalents, and alternatives thereof.

Hereinafter, an embodiment of the present disclosure will be described with reference to the accompanying drawings.

FIG. 1 illustrates a pairing system according to an embodiment of the present disclosure.

As illustrated in FIG. 1, the pairing system according to an embodiment of the present disclosure may include a user terminal 10, a wireless relay device 20, and a service device 30.

The user terminal 10 refers to a device configured to process pairing with a service device 30 and may process pairing with the service device 30 through a user configuration process based on a User Interface (UI) provided by an application.

The user terminal 10 may be, for example, a smart phone, a portable terminal, a mobile terminal, a Personal Digital Assistant (PDA), a Portable Multimedia Player (PMP) terminal, a telematics terminal, a navigation terminal, a Personal Computer (PC), a notebook computer, a slate PC, a table PC, an Ultrabook, a wearable device (for example, a watch-type terminal (smart watch), a glass-type terminal (smart glass), or a Head-Mounted Display (HMD)), a Wibro terminal, an Internet Protocol Television (IPTV) terminal, a smart TV, a digital broadcast terminal, a television, a 3D television, a home theater system, an Audio Video Navigation (AVN) terminal, an Audio/Video (A/V) system, or a flexible terminal, but the present disclosure is not limited thereto and may include any device in which the application can be installed.

The wireless relay device 20 refers to a device configured to provide a radio access environment (for example, Wi-Fi) to the user terminal 10 and the service device 30, and, for example, an Access Point (AP) may correspond thereto.

The Service device 30 refers to a service device introduced to promote user convenience and may correspond to, for example, a device supporting an immediate purchase of a configured product without any user intervention in selecting a product, selecting a payment means, and inputting a destination of delivery through a linkage with a service server when a user request (an immediate product purchase request) such as button input for an online purchase service is identified.

For reference, the service server (not shown) refers to a server configured to process an immediate product purchase service requested from the service device 30, and may identify a product mapped to device identification information (for example, MAC or Serial) of the service device 30 according to the immediate product purchase request from the service device 30 and process payment and delivery thereof without separate user intervention.

However, in order to process the immediate production purchase, it is based upon the premise that information on a particular product, a payment means, or a destination of delivery should be mapped to the device identification information (for example, MAC or Serial) of the service device 30.

Meanwhile, the service server (not shown) may be implemented in the form of, for example, a web server, a database server, or a proxy server, or may be implemented as a computerized system through installation of one or more of various pieces of software that allow a network load distribution mechanism or a service device to operate on the Internet or another network. Further, the network may be an http network, a private line, an intranet, or another network, and a connection between elements within an advertisement providing system according to an embodiment of the present disclosure may be made through a security network to prevent data from being compromised by an arbitrary hacker or another third party.

As described above, the pairing system according to an embodiment of the present disclosure may process pairing between the user terminal 10 and the service device 30 by inducing access of the service device 30 to the wireless relay device 20 based on the above-described configuration.

At this time, the connection between the service device 30 and the wireless relay device 20 has the relation made in a TCP type, and the user terminal 10 causes user inconvenience since a complicated user configuration process is required to process the pairing between the user terminal 10 and the service device 30.

Accordingly, an embodiment of the present disclosure proposes a new method of minimizing the user configuration process required for the pairing procedure between the user terminal 10 and the service device 30 and, hereinafter, respective elements within the pairing system for implementing the new method will be described in more detail.

Figure 2:
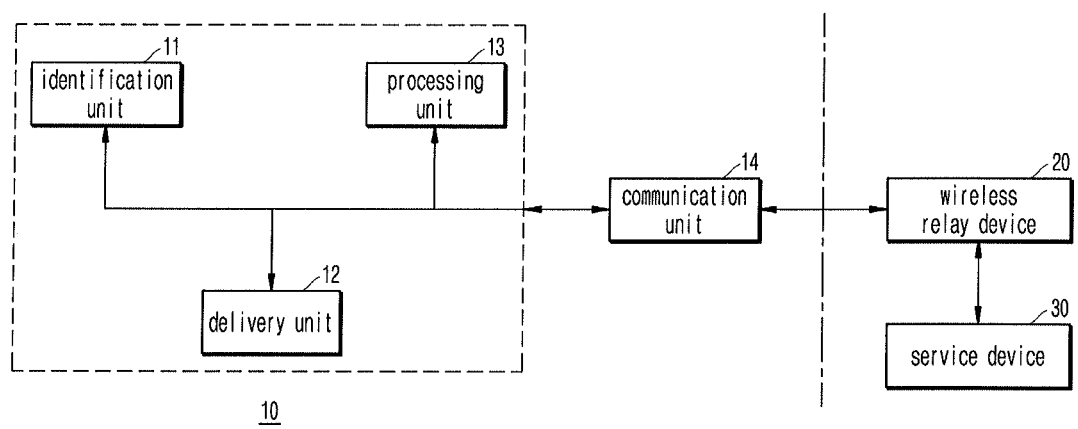
FIG. 2 is a block diagram schematically illustrating a user terminal in one form of the present disclosure.

FIG. 2 is a block diagram schematically illustrating the user terminal 10 according to an embodiment of the present disclosure.

As illustrated in FIG. 2, the user terminal 10 according to an embodiment of the present disclosure may include an identification unit 11 configured to identify the service device 30, a delivery unit 12 configured to deliver access information of the wireless relay device 20, and a processing unit 13 configured to process pairing.

All or at least some of the elements of the user terminal 10 including the identification unit 11, the delivery unit 12, and the processing unit 13 may be implemented in the form of a software module or a hardware module executed by a processor or in the form of a combination of the software module and the hardware module.

The software module may be understood as an instruction based on an application executed by the processor for processing calculations within the user terminal 10 and the instruction may be installed in a memory within the user terminal 10.

Meanwhile, the user terminal 10 according to an embodiment may further include a communication unit 14 which is an RF module supporting actual communication with the service device 30 through the wireless relay device 20 as well as the above-described elements.

Since the communication unit 14 corresponds to a communication unit 1310 described below with reference to FIG. 3, a detailed description thereof will be omitted.

The user terminal 10 according to an embodiment may process pairing with the service device 30 through the core elements including the identification unit 11, the delivery unit 12, and the processing unit 13, and hereinafter, each of the core elements within the user terminal 10 for implementing it will be described in more detail.

For reference, for convenience of description, it is assumed that the user terminal 10 is connected to the wireless relay device 20.

The identification unit 11 performs a function of identifying the service device 30.

More specifically, when pairing with the service device 30 is requested, the identification unit 11 identifies whether the service device 30 is located within the coverage of the wireless relay device 20.

At this time, the identification unit 11 may identify whether the service device 30 is located within the coverage of the wireless relay device 20 through a predefined pattern signal.

The pattern signal may be defined to include a particular binary value repeated a predetermined number of times, but is not limited thereto and may include any scheme of designating a particular pattern to the signal.

That is, the identification unit 11 may transmit a pattern signal to the wireless relay device 20 so that the service device 30 located within the coverage of the wireless relay device 20 can recognize the pattern signal, and when it is identified that the same pattern signal is transmitted from the service device 30 having recognized the pattern signal, identify that the service device 30, which is a counterpart to be paired, is located within the coverage of the wireless relay device 30.

In connection with this, when the user terminal 10 transmits a predefined pattern signal to the wireless relay device 20 and thus the service device 30 recognizes the pattern signal from the coverage of the wireless relay device 20, the service device 30 may transmit (for example, broadcast) the recognized pattern signal and the user terminal 10 may identify the transmitted pattern signal.

The delivery unit 12 performs a function of transmitting access information of the wireless relay device 20.

More specifically, when it is identified that the service device 30 is located within the coverage of the wireless relay device 20, the delivery unit 12 may deliver an access message containing access information (for example, an SSID/PW) of the wireless relay device 20 to the service device 30.

At this time, the delivery unit 12 may deliver the message containing the access information of the wireless relay device 20 to the wireless relay device 20, and thus the transmitted message may be also transmitted to the service device 30 located within the coverage of the wireless relay device 20.

As described above, the access message delivered to the wireless relay device 20 may contain access information (for example, an IP or Port) of the user terminal 10 as well as the access information (for example, the SSID/PW) of the wireless relay device 20, and the message may be transmitted while being encrypted according to a predetermined encryption scheme arranged between the user terminal 10 and the service device 30.

In connection with this, when the access information (for example, the SSID/PW) of the wireless relay device 20 is delivered through the coverage of the wireless relay device 20, the service device 30 may access the wireless relay device 20 based on the received access information (for example, the SSID/PW) and, when the access to the wireless relay device 20 using the received access information (for example, the SSID/PW) is impossible, may notify of the state in which the access is impossible through a prepared I/O means (for example, an LED, a display, a speaker, or a buzzer) so that the user can recognize it.

The wireless relay device 20 cannot access the wireless relay device 20 in the case in which password information within the access information (for example, the SSID/PW) is wrong like the case in which the user inputs incorrect password information during a user configuration process processed by the user terminal 10.

Meanwhile, when the wireless relay device 20 receives the message containing the access information of the wireless relay device 20, the wireless relay device 20 may delete or ignore the corresponding message.

The processing unit 13 performs a function of processing pairing with the service device 30.

More specifically, the processing unit 13 processes pairing with the service device 30 accessing the wireless relay device 20 based on the access information (for example, the SSID/PW) of the wireless relay device 20.

At this time, the processing unit 13 may process pairing with the service device 30 by transmitting a response message of the pairing message received from the service device 30 in a unicast type.

The pairing message received by the service device 30 may contain device identification information (for example, MAC or Serial) of the service device 30, but the response message may contain access information (for example, IP or Port) of a service server (not shown) to which the service device 30 accesses.

Meanwhile, after accessing the wireless relay device 30, the service device 30 may deliver the pairing message in a unicast type based on the access information (for example, the IP or Port) of the user terminal 10 transmitted together with the access information (for example, the SSID/PW) of the wireless relay device 20 through the coverage of the wireless relay device 20, thereby increasing a pairing success rate compared to the conventional method that complies with a User Datagram Protocol (UDP)-based broadcasting scheme.

Each element within the user terminal 10 may be implemented in the form of a software module or a hardware module executed by a processor or in the form of a combination of the software module and the hardware module.

As described above, the software module and the hardware module executed by the processor and the combination of the software module and the hardware module may be implemented by a hardware system (for example, a computer system).

Accordingly, hereinafter, a hardware system 1000 for implementing the user terminal 10 according to an embodiment of the present disclosure will be described with reference to FIG. 3.

For reference, the following description is an example for implementing respective elements within the user terminal 10 as the hardware system 1000, and it should be noted that each element and the operation thereof may be different from those in the actual system.

Figure 3:
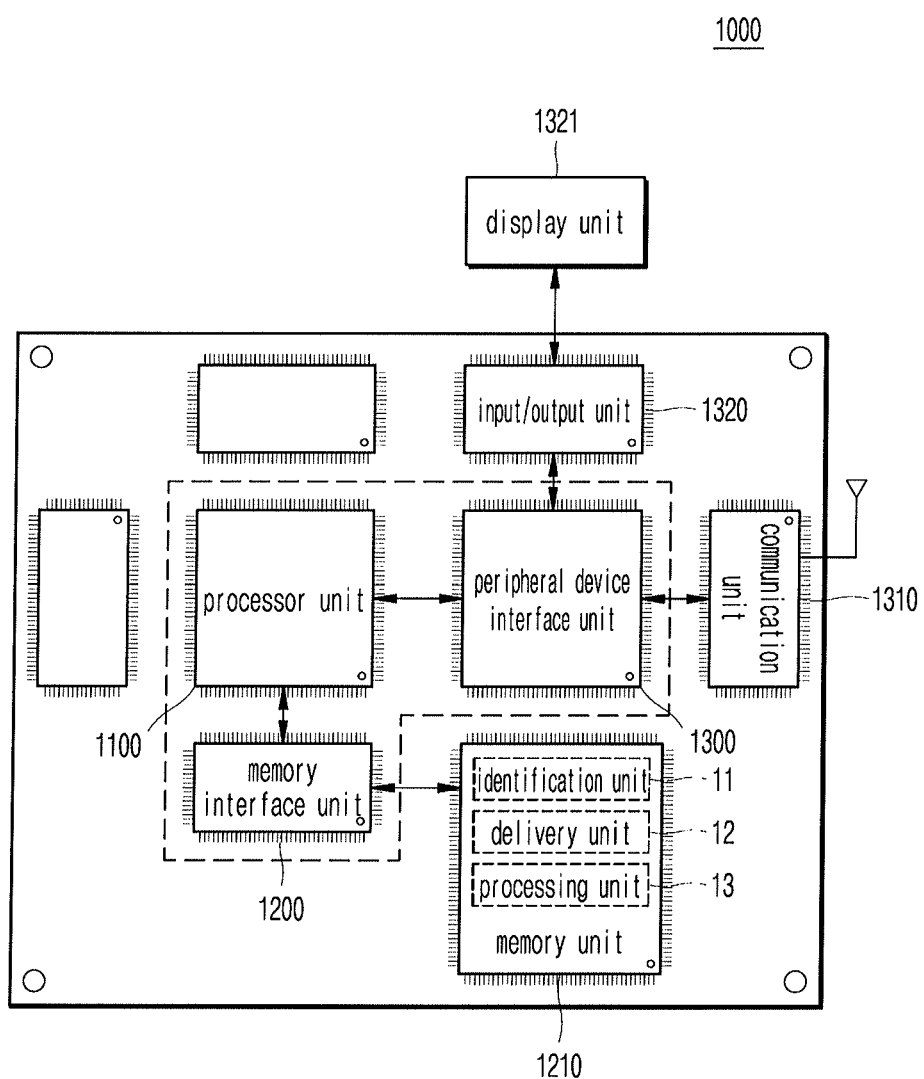
FIG. 3 illustrates a hardware system for implementing a user terminal in one form of the present disclosure.

As illustrated in FIG. 3, the hardware system 1000 according to an embodiment of the present disclosure may include a processor unit 1100, a memory interface unit 1200, and a peripheral device interface unit 1300.

The respective elements within the hardware system 1000 may be individual elements or integrated into one or more integrated circuits, and may be combined by a bus system (not shown).

The bus system corresponds to abstraction indicating one or more individual physical buses, communication lines/interfaces, multi-drop, and/or point-to-point connections connected by proper bridges, adaptors, and/or controllers.

The processor unit 1100 may serve to execute various software modules stored in the memory unit 1210 by communicating with the memory unit 1210 through the memory interface unit 1200 in order to perform various performs in the hardware system.

The memory unit 1210 may store the identification unit 11, the delivery unit 12, and the processing unit 13, which are the core elements of the user terminal 10 described with reference to FIG. 2, in the software module form, and may further store Operating System (OS).

The operating system (for example, an embedded operating system such as iOS, Android, Darwin, RTXC, LINUX, UNIX, OSX, WINDOWS, or VxWorks) includes various procedures for controlling and managing general system tasks (for example, memory management, storage device control, and power management), an instruction set, a software component, and/or a driver, and serves to make communication between various hardware modules and software modules easy.

For reference, the memory unit 1210 includes a cache, a main memory, and a secondary memory but is not limited thereto, and may include a memory layer structure. The memory layer structure may be implemented through a predetermined combination of, for example, a RAM (for example, SRAM, DRAM, or DDRAM), a ROM, a FLASH, a magnetic and/or optical storage device (for example, a disk drive, a magnetic tape, a Compact Disk (CD), and a Digital Video Disc (DVD)).

The peripheral interface unit 1300 enables communication between the processor unit 1100 and peripheral devices.

The peripheral device may provide different functions to the hardware system 1000 and may include, for example, a communication unit 1310 and an input/output unit 1320 according to an embodiment of the present disclosure.

The communication unit 1310 serves to provide a communication function with another device. To this end, the communication unit 1310 may include, for example, an antenna system, an RF transceiver, one or more amplifiers, a tuner, one or more oscillators, a digital signal processor, a CODEC chipset, and a memory, but is not limited thereto, and may include a known circuit for performing the function.

Communication protocols supported by the communication unit 1310 may include, for example, Wireless LAN (WLAN), Digital Living Network Alliance (DLNA), Wireless broadband (Wibro), World interoperability for microwave access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband service (WMBS), Bluetooth, Radio Frequency Identification (RFID), Infrared Data Association (IrDA), Ultra-Wideband (UWB), ZigBee, Near Field Communication (NFC), Ultra Sound Communication (USC), Visible Light Communication (VLC), Wi-Fi, and Wi-Fi Direct. Wired communication networks may include wired Local Area Network (LAN), wired Wide Area Network (WAN), Power Line Communication (PLC), USB communication, Ethernet, serial communication, and optical fiber/coaxial cable, but are not limited thereto and may include nay protocol that can provide a communication environment with another device.

Further, the input/output unit 1320 may serve as a controller for controlling an I/O device linked to other hardware systems, and may perform a function of displaying an application UI screen related to pairing on a display unit 1321 according to an embodiment of the present disclosure.

The display unit 1321 may support a touch interface and may be implemented as, for example, a Liquid Crystal Display (LCD), Thin Film Transistor LCD (TFT-LCD), a Light Emitting Diode (LED), an Organic LED (OLED), an Active Matrix OLED (AMOLED), a retina display, a flexible display, and a 3-dimensional display.

As a result, according to the above configuration, each element within the user terminal 10 stored in the software module form in the memory unit 1210 may be linked to the communication unit 1310 and the input/output unit 1320 via the memory interface unit 1200 and the peripheral device interface unit 1300 in the form of instructions executed by the processor 1100, thereby processing pairing with the service device 30.

Hereinafter, for assisting in understanding description, each element of the user terminal 10 will be described based on a linkage with the hardware system 1000 with reference to FIG. 3.

The identification unit 11 performs a function of identifying the service device 30.

More specifically, when pairing with the service device 30 is requested, the identification unit 11 identifies whether the service device 30 is located within the coverage of the wireless relay device 20 and transfers the identification result to the delivery unit 12.

At this time, the identification unit 11 may transmit a predefined pattern signal to the wireless relay device 20 through the communication unit 1310 and thus the service device 30 located within the coverage of the wireless relay device 20 may recognize the pattern signal, and when it is identified that the same pattern signal is transmitted from the service device 30 having recognized the pattern signal, may identify that the service device 30, which is a counterpart to be paired, is located within the coverage of the wireless relay device 20.

In connection with this, when the user terminal 10 transmits a predefined pattern signal to the wireless relay device 20 and thus the service device recognizes the pattern signal from the coverage of the wireless relay device 20, the service device 30 may transmit (for example, broadcast) the recognized pattern signal and the user terminal 10 may identify the pattern transmitted signal.

The delivery unit 12 performs a function of transmitting access information of the wireless relay device 20.

More specifically, when it is identified that the service device 30 is located within the coverage of the wireless relay device 20, the delivery unit 12 may deliver an access message containing access information (for example, an SSID/PW) of the wireless relay device 20 to the service device 30.

At this time, since the delivery unit 12 may deliver the message containing the access information of the wireless relay device 20 to the wireless relay device 20 through the communication unit 1310, the delivered message may be also delivered to the service device 30 located within the coverage of the wireless relay device 20.

As described above, the access message delivered to the wireless relay device 20 may contain access information (for example, an IP or Port) of the user terminal 10 as well as the access information (for example, the SSID/PW) of the wireless relay device 20, and the message may be delivered while being encrypted according to a predetermined encryption scheme arranged between the user terminal 10 and the service device 30.

In connection with this, when the access information (for example, the SSID/PW) of the wireless relay device 20 is delivered through the coverage of the wireless relay device 20, the service device 30 may access the wireless relay device 20 based on the received access information (for example, the SSID/PW) and, when the access to the wireless relay device 20 using the received access information (for example, the SSID/PW) is impossible, may notify of the state in which the access is impossible through a prepared I/O means (for example, an LED, a display, a speaker, or a buzzer) so that the user can recognize it.

Meanwhile, when the wireless relay device 20 receives the message containing the access information of the wireless relay device 20, the wireless relay device 20 may delete or ignore the corresponding message.

The processing unit 13 performs a function of processing pairing with the service device 30.

More specifically, the processing unit 13 processes pairing with the service device 30 accessing the wireless relay device 20 based on the access information (for example, the SSID/PW) of the wireless relay device 20.

At this time, the processing unit 13 may process pairing with the service device 30 by transmitting a response message of the pairing message received in a unicast type from the service device 30 through the communication unit 1310 to the service device 30 through the communication unit 1310.

The pairing message received by the service device 30 may contain device identification information (for example, MAC or Serial) of the service device 30, and the response message may contain access information (for example, IP or Port) of a service server (not shown) to which the service device 30 accesses.

Meanwhile, after accessing the wireless relay device 20, the service device 30 may deliver the pairing message in a unicast type through the access information (for example, the IP or Port) of the user terminal 10 delivered together with the access information (for example, the SSID/PW) of the wireless relay device 20 through the coverage of the wireless relay device 20, thereby increasing a pairing success rate compared to the conventional method that complies with a User Datagram Protocol (UDP)-based broadcasting scheme.

The user terminal 10 according to an embodiment of the present disclosure has been described above and the service device 30 will next be described below.

Figure 4:
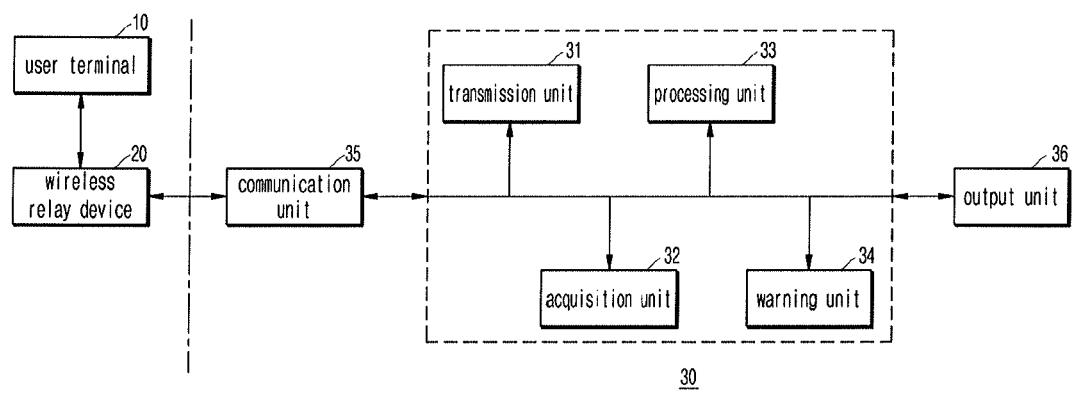
FIG. 4 is a block diagram schematically illustrating a service device in one form of the present disclosure.

FIG. 4 is a block diagram schematically illustrating the service device 30 according to an embodiment of the present disclosure.

As illustrated in FIG. 4, the service device 30 according to an embodiment of the present disclosure may include a transmission unit 31 configured to transmit a pattern signal, an acquisition unit 32 configured to acquire access information, a processing unit 33 configured to process pairing, and a warning unit 34 configured to provide a warning about an inaccessible state.

All or at least some of the elements of the service device 30 including the transmission unit 31, the acquisition unit 32, the processing unit 33, and the warning unit 34 may be implemented in the form of a software module or a hardware module executed by the processor or in the form of a combination of the software module and the hardware module.

The software module may be understood as, for example, an instruction based on an application executed by the processor for processing calculations within the service device 30 and the instruction may be installed in a memory within the service device 30.

Meanwhile, the service device 30 according to an embodiment of the present disclosure may further include a communication unit 35, which is an RF module supporting actual communication with the user terminal 10 through the wireless relay device 20, and an output unit 36 configured to output the inaccessible state as well as the above-described elements.

Since the communication unit 35 and the output unit 36 correspond to a communication unit 2310 and an output unit 2321 described below with reference to FIG. 5, a detailed description thereof will be omitted.

As a result, the service device 30 according to an embodiment of the present disclosure may process pairing with the user terminal 10 through the core elements including the transmission unit 31, the acquisition unit 32, the processing unit 33, and the warning unit 34 and, hereinafter, each of the core elements within the service device 30 for implementing it will be described in more detail.

The transmission unit 31 performs a function of transmitting a predefined pattern signal.

More specifically, when the user terminal 10 transmits the predefined pattern signal to the wireless relay device 20 and thus the pattern signal is recognized from the coverage of the wireless relay device 20, the transmission unit 31 may transmit (for example, broadcast) the recognized pattern signal and the user terminal 10 may identify the transmitted pattern signal.

In connection with this, as pairing with the service device 30 is requested, the user terminal 10 may transmit the predefined pattern signal to the wireless relay device 20 and thus the service device 30 located within the coverage of the wireless relay device 20 may recognize the pattern signal. Further, when it is identified that the same pattern signal is transmitted from the service device 30 having recognized the pattern signal, the user terminal 10 may identify that the service device 30, which is a counterpart to be paired, is located within the coverage of the wireless relay device 20.

The acquisition unit 32 performs a function of acquiring access information of the wireless relay device 20.

More specifically, the acquisition unit 32 acquires access information (for example, an SSID/PW) of the wireless relay device 20 transmitted by the user terminal 10 from the coverage of the wireless relay device 20.

In connection with this, when it is identified that the service device 30 is located with the coverage of the wireless relay device 20 according to reception of the pattern signal, the user terminal 10 may transmit an access message containing the access information (for example, the SSID/PW) of the wireless relay device 20 to the service device 30.

In other words, the user terminal 10 transmits the message containing access information of the wireless relay device 20 to the wireless relay device 20 and thus allows the service device 30 to acquire the transmitted message from the coverage of the wireless relay device 20.

As described above, the access message transmitted to the wireless relay device 20 may contain access information (for example, an IP or Port) of the user terminal 10 as well as the access information (for example, the SSID/PW) of the wireless relay device 20, and the message may be transmitted while being encrypted according to a predetermined encryption scheme arranged between the user terminal 10 and the service device 30.

The processing unit 33 performs a function of processing pairing with the user terminal 10.

More specifically, when the access information (for example, the SSID/PW) of the wireless relay device 20 is acquired through the coverage of the wireless relay device 20, the processing unit 33 accesses the wireless relay device 20 based on the access information (for example, the SSID/PW) and process pairing with the user terminal 10.

At this time, the processing unit 33 may transmit a pairing message to the user terminal 10 in a unicast type and receive a response message thereof from the user terminal 10, thereby processing pairing with the user terminal 10.

The pairing message may contain device identification information (for example, MAC or Serial) of the service device 30, but the response message may contain access information (for example, IP or Port) of a service server (not shown) to which the service device 30 accesses.

As described above, after accessing the wireless relay device 20, the processing unit 33 may transmit the pairing message in a unicast type based on the access information (for example, the IP or Port) of the user terminal 10 transmitted together with the access information (for example, the SSID/PW) of the wireless relay device 20 through the coverage of the wireless relay device 20, thereby increasing a pairing success rate compared to the conventional method that complies with a User Datagram Protocol (UDP)-based broadcasting scheme.

The warning unit 34 performs a function of providing a warning about an inaccessible state.

More specifically, when access to the wireless relay device 20 using the access information (for example, the SSID/PW) is impossible, the warning unit 34 may provide a warning about the inaccessible state through, for example, a prepared I/O means (for example, an LED, a display, a speaker, or a buzzer), so that the user may recognize the inaccessible state.

It is impossible to access to the wireless relay device 20 when password information of the access information (for example, the SSID/PW) is wrong like the case in which the user inputs incorrect password information during a user configuration process processed by the user terminal 10.

Meanwhile, each element within the service device 30 may be implemented in the form of a software module or a hardware module executed by the processor or in the form of a combination of the software module and the hardware module.

As described above, the software module and the hardware module executed by the processor, and the combination of the software module and the hardware module may be implemented by a hardware system (for example, a computer system).

Accordingly, hereinafter, a hardware system 2000 implementing each element within the service device 30 according to an embodiment of the present disclosure will be described with reference to FIG. 5.

Figure 5:
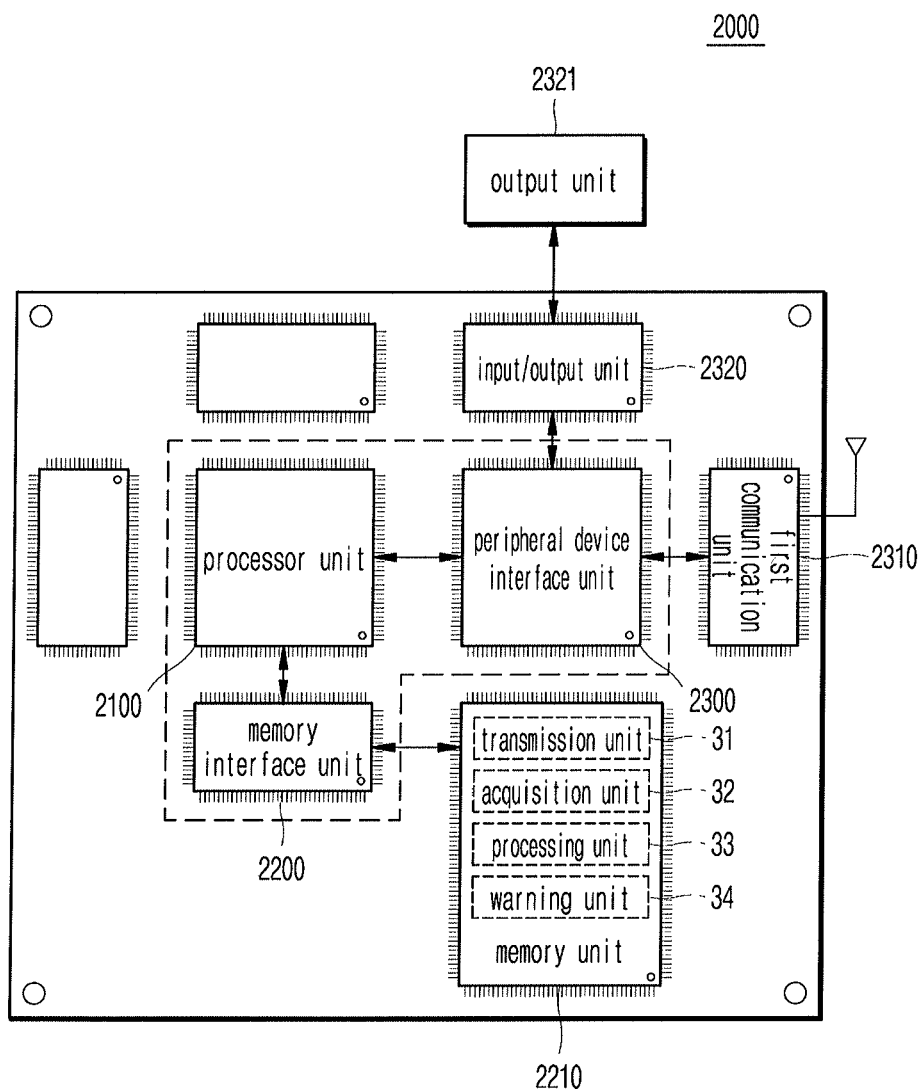
FIG. 5 illustrates a hardware system for implementing a service device in one form of the present disclosure.

As illustrated in FIG. 5, the hardware system 2000 for implementing the service device 30 according to an embodiment of the present disclosure may include a processor unit 2100, a memory interface unit 2200, and a peripheral interface unit 2300.

The respective elements within the hardware system 2000 may be individual elements or integrated into one or more integrated circuits, and may be combined by a bus system (not shown).

The bus system corresponds to abstraction indicating one or more individual physical buses, communication lines/ interfaces, multi-drop, and/or point-to-point connections connected by proper bridges, adaptors, and/or controllers.

The processor unit 2100 may serve to execute various software modules stored in the memory unit 2210 by communicating with the memory unit 2210 through the memory interface unit 2200 in order to perform various performs in the hardware system.

The memory unit 2210 may store the transmission unit 31, the acquisition unit 32, the processing unit 34, and the warning unit 35, which are the core elements within the service device 30 described with reference to FIG. 4, in the software module form, and may further store Operating System (OS).

The operating system (for example, an embedded operating system such as iOS, Android, Darwin, RTXC, LINUX, UNIX, OSX, WINDOWS, or VxWorks) includes various procedures for controlling and managing general system tasks (for example, memory management, storage device control, and power management), an instruction set, a software component, and/or a driver, and serves to make communication between various hardware modules and software modules easy.

For reference, the memory unit 2210 includes a cache, a main memory, and a secondary memory but is not limited thereto, and may include a memory layer structure. The memory layer structure may be implemented through a predetermined combination of, for example, a RAM (for example, SRAM, DRAM, or DDRAM), a ROM, a FLASH, a magnetic and/or optical storage device (for example, a disk drive, a magnetic tape, a Compact Disk (CD), and a Digital Video Disc (DVD)).

The peripheral interface unit 2300 enables communication between the processor unit 2100 and peripheral devices.

The peripheral device may provide different functions to the hardware system 2000 and may include, for example, a communication unit 2310 and an input/output unit 2320 according to an embodiment of the present disclosure.

The communication unit 2310 serves to provide a communication function with another device. To this end, the communication unit 1310 may include, for example, an antenna system, an RF transceiver, one or more amplifiers, a tuner, one or more oscillators, a digital signal processor, a CODEC chipset, and a memory, but is not limited thereto, and may include a known circuit for performing the function.

Communication protocols supported by the communication unit 2310 may include, for example, Wireless LAN (WLAN), Digital Living Network Alliance (DLNA), Wireless broadband (Wibro), World interoperability for microwave access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband service (WMBS), Bluetooth, Radio Frequency Identification (RFID), Infrared Data Association (IrDA), Ultra-Wideband (UWB), ZigBee, Near Field Communication (NFC), Ultra Sound Communication (USC), Visible Light Communication (VLC), Wi-Fi, and Wi-Fi Direct. Wired communication networks may include wired Local Area Network (LAN), wired Wide Area Network (WAN), Power Line Communication (PLC), USB communication, Ethernet, serial communication, and optical fiber/coaxial cable, but are not limited thereto and may include nay protocol that can provide a communication environment with another device.

The input/output unit 2320 serves as a controller for controlling an I/O device linked to other hardware systems, and the output unit 2321 may perform a function of outputting a state in which access to the wireless relay device 20 is impossible.

The output unit 2321 may be implemented as an I/O means, for example, an LED, a display, a speaker, or a buzzer.

As a result, each element within the user terminal 20 stored in the software module form in the memory unit 2210 may process pairing with the user terminal 10 by communicating with the communication unit 2310 via the memory interface unit 2200 and the peripheral device interface unit 2300 in the form of instructions executed by the processor unit 2100.

Hereinafter, for assisting in understanding description, each element of the service device 30 will be described based on a linkage with the hardware system 2000 with reference to FIG. 5.

The transmission unit 31 performs a function of transmitting a predefined pattern signal.

More specifically, when the user terminal 10 transmits a predefined pattern signal to the wireless relay device 20 and thus the pattern signal is received and recognized through the communication unit 2310 within the coverage of the wireless relay device 20, the transmission unit 31 may transmit (for example, broadcast) the recognized pattern signal through the communication unit 2310 and the user terminal 10 may identify the transmitted pattern signal.

In connection with this, as pairing with the service device 30 is requested, the user terminal 10 may transmit the predefined pattern signal to the wireless relay device 20 and thus the service device 30 located within the coverage of the wireless relay device 20 may recognize the pattern signal. Further, when it is identified that the same pattern signal is transmitted from the service device 30 having recognized the pattern signal, the user terminal 10 may identify that the service device 30, which is a counterpart to be paired, is located within the coverage of the wireless relay device 20.

The acquisition unit 32 performs a function of acquiring access information of the wireless relay device 20.

More specifically, the acquisition unit 32 acquires access information (for example, an SSID/PW) of the wireless relay device 20 transmitted by the user terminal 10 through the communication unit 2310 from the coverage of the wireless relay device 20 and transfers the acquired access information (for example, the SSID/PW) to the processing unit 33.

In connection with this, when it is identified that the service device 30 is located with the coverage of the wireless relay device 20 according to reception of the pattern signal, the user terminal 10 may transmit an access message containing the access information (for example, the SSID/PW) of the wireless relay device 20 to the service device 30.

In other words, the user terminal 10 transmits the message containing access information of the wireless relay device 20 to the wireless relay device 20 and thus allows the service device 30 to acquire the transmitted message from the coverage of the wireless relay device 20.

As described above, the access message transmitted to the wireless relay device 20 may contain access information (for example, an IP or Port) of the user terminal 10 as well as the access information (for example, the SSID/PW) of the wireless relay device 20, and the message may be transmitted while being encrypted according to a predetermined encryption scheme arranged between the user terminal 10 and the service device 30.

The processing unit 33 performs a function of processing pairing with the user terminal 10.

More specifically, when the access information (for example, the SSID/PW) of the wireless relay device 20 is received through the coverage of the wireless relay device 20, the processing unit 33 accesses the wireless relay device 20 based on the access information (for example, the SSID/PW) and process pairing with the user terminal 10.

At this time, the processing unit 33 may transmit a pairing message to the user terminal 10 through the communication unit 2310 in a unicast type and receive a response message thereof from the user terminal 10 through the communication unit 2310, thereby processing pairing with the user terminal 10.

The pairing message may contain device identification information (for example, MAC or Serial) of the service device 30, but the response message may contain access information (for example, IP or Port) of a service server (not shown) to which the service device 30 accesses.

As described above, after accessing the wireless relay device 20, the processing unit 33 may transmit the pairing message in a unicast type based on the access information (for example, the IP or Port) of the user terminal 10 transmitted together with the access information (for example, the SSID/PW) of the wireless relay device 20 through the coverage of the wireless relay device 20, thereby increasing a pairing success rate compared to the conventional method that complies with a User Datagram Protocol (UDP)-based broadcasting scheme.

The warning unit 34 performs a function of providing a warning about an inaccessible state.

More specifically, when access to the wireless relay device 20 using the access information (for example, the SSID/PW) is impossible, the warning unit 34 may provide a warning about an inaccessible state through the output unit 2321, so that the user can recognize the inaccessible state.

It is impossible to access to the wireless relay device 20 when password information with the access information (for example, the SSID/PW) is wrong like the case in which the user inputs incorrect password information during a user configuration process processed by the user terminal 10.

As described above, according to each element within the pairing system according to an embodiment of the present disclosure, a user configuration process required for a pairing procedure between the user terminal 10 and the service device 30 via the wireless relay device 20 may be minimized to the extent of only input of password information of the wireless relay device 20, so that user convenience in using the service device 30 can be improved.

Hereinafter, an pairing system according to an embodiment of the present disclosure and an operation flow of each element within the system will be described.

Figure 6:
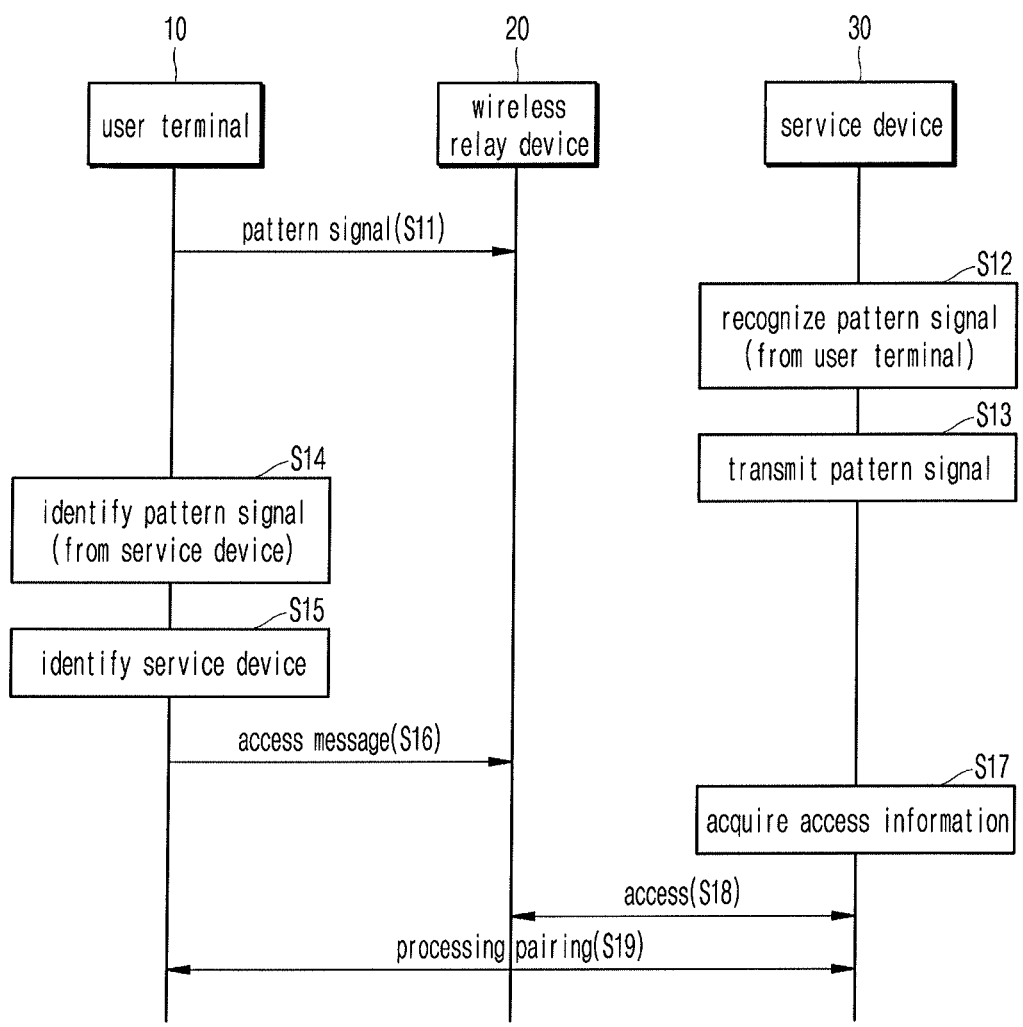
FIG. 6 is a flowchart illustrating the operation flow of a pairing system in one form of the present disclosure.

FIG. 6 illustrates the operation flow in the pairing system according to an embodiment of the present disclosure.

First, as pairing with the service device 30 is requested, the user terminal 10 may transmit a predefined pattern signal to the wireless relay device 20 in step S11, so that the service device 30 located within the coverage of the wireless relay device 20 can recognize the pattern signal.

When the service device 30 recognizes the pattern signal transmitted by the user terminal 10 within the coverage of the wireless relay device 20 in step S12, the service device 30 may transmit (for example, broadcast) the recognized pattern signal in S13 and the user terminal 10 may identify the transmitted pattern signal.

Subsequently, when the user terminal 10 identifies transmission of the same pattern signal from the service device 30 having recognized the pattern signal, the user terminal 10 identifies that the service device 30 which is a counterpart to be paired, is located within the coverage of the wireless relay device 30 in steps S14 and S15.

Next, when the user terminal 10 identifies that the service device 30 is located with the coverage of the wireless relay device 20, the user terminal 10 may transmit an access message containing the access information (for example, the SSID/PW) of the wireless relay device 20 to the service device 30 in step S16.

At this time, as the user terminal 10 transmits the message containing the access information of the wireless relay device 20, the transmitted message may be also transferred to the service device 30 located within the coverage of the wireless relay device 20.

As described above, the access message transmitted to the wireless relay device 20 may contain access information (for example, an IP or Port) of the user terminal 10 as well as the access information (for example, the SSID/PW) of the wireless relay device 20, and the message may be transmitted while being encrypted according to a predetermined encryption scheme arranged between the user terminal 10 and the service device 30.

The service device 30 acquires the access information (for example, the SSID/PW) of the wireless relay device 20 transmitted by the user terminal 10 from the coverage of the wireless relay device 30 in step S17.

Further, when the service device 30 acquires the access information (for example, the SSID/PW) of the wireless relay device 20 through the coverage of the wireless relay device 20, the service device 30 accesses the wireless relay device 20 based on the access information (for example, the SSID/PW) and processes pairing with the user terminal 10 in steps S18 and S19.

At this time, the service device 30 may transmit a pairing message to the user terminal 10 in a unicast type and receive a response message thereof from the user terminal 10, thereby processing pairing with the user terminal 10.

The pairing message may contain device identification information (for example, MAC or Serial) of the service device 30, but the response message may contain access information (for example, IP or Port) of a service server (not shown) to which the service device 30 accesses.

As described above, after the access to the wireless relay device 30, when the pairing message is transmitted in a unicast type based on the access information (for example, the IP or Port) of the user terminal 10 transmitted together with the access information (for example, the SSID/PW) of the wireless relay device 20 through the coverage of the wireless relay device 20, a pairing success rate may increase compared to the conventional method that complies with a User Datagram Protocol (UDP)-based broadcasting scheme.

The operation flow in the pairing system according to an embodiment of the present disclosure has been described above and, subsequently, the operation flow of the user terminal 10 will be described.

Figure 7:
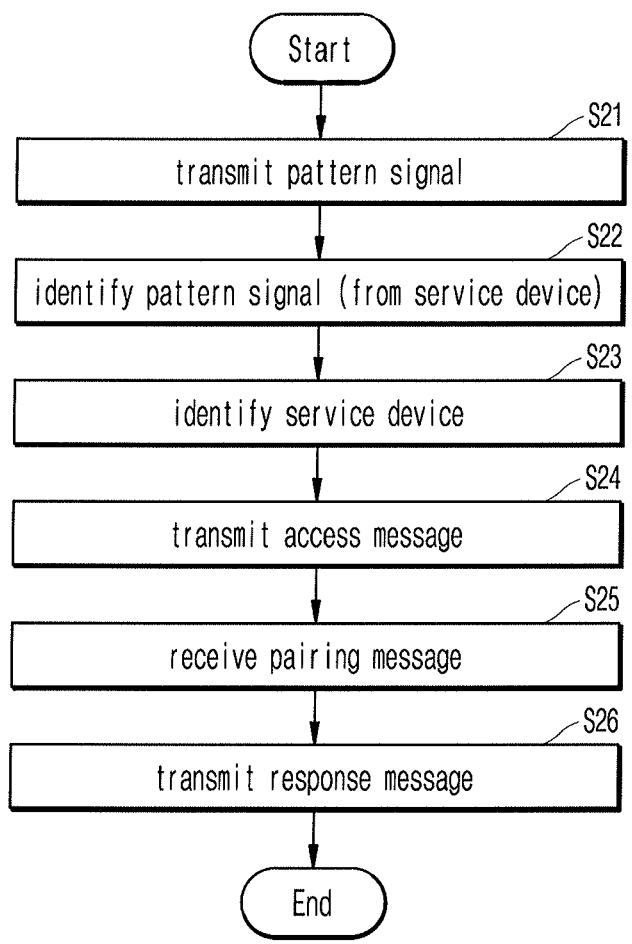
FIG. 7 is a flowchart schematically illustrating the operation flow of a user terminal in one form of the present disclosure.

FIG. 7 illustrates the operation flow of the user terminal 10 according to an embodiment of the present disclosure.

First, when pairing with the service device 30 is requested, the identification unit 11 identifies whether the service device 30 is located within the coverage of the wireless relay device 20 in steps S21 to S23.

At this time, the identification unit 11 may identify whether the service device 30 is located within the coverage of the wireless relay device 20 through a predefined pattern signal.

The pattern signal may be defined to include a particular binary value repeated a predetermined number of times, but is not limited thereto and may include any scheme of designating a particular pattern to the signal.

That is, the identification unit 11 may transmit a pattern signal to the wireless relay device 20 so that the service device 30 located within the coverage of the wireless relay device 20 can recognize the pattern signal, and when it is identified that the same pattern signal is transmitted from the service device 30 having recognized the pattern signal, identify that the service device 30, which is a counterpart to be paired, is located within the coverage of the wireless relay device 20.

In connection with this, when the user terminal 10 transmits a predefined pattern signal to the wireless relay device 20 and thus the service device 30 recognizes the pattern signal from the coverage of the wireless relay device 20, the service device 30 may transmit (for example, broadcast) the recognized pattern signal and the user terminal 10 may identify the transmitted pattern signal.

Next, when it is identified that the service device 30 is located with the coverage of the wireless relay device 20, the transmission unit 12 may transmit an access message containing the access information (for example, the SSID/PW) of the wireless relay device 20 to the service device 30 in step S24.

At this time, as the transmission unit 12 may transmit the message containing the access information of the wireless relay device 20 to the wireless relay device 20, the transmitted message may be also transferred to the service device 30 located within the coverage of the wireless relay device 20.

As described above, the access message transmitted to the wireless relay device 20 may contain access information (for example, an IP or Port) of the user terminal 10 as well as the access information (for example, the SSID/PW) of the wireless relay device 20, and the message may be transmitted while being encrypted according to a predetermined encryption scheme arranged between the user terminal 10 and the service device 30.

In connection with this, when the access information (for example, the SSID/PW) of the wireless relay device 20 is transmitted through the coverage of the wireless relay device 20, the service device 30 may access the wireless relay device 20 based on the received access information (for example, the SSID/PW) and, when the access to the wireless relay device 20 using the received access information (for example, the SSID/PW) is impossible, may notify of the state in which the access is impossible through a prepared I/O means (for example, an LED, a display, a speaker, or a buzzer) so that the user can recognize it.

It is impossible to access to the wireless relay device 20 when password information with the access information (for example, the SSID/PW) is wrong like the case in which the user inputs incorrect password information during a user configuration process processed by the user terminal 10.

Meanwhile, when the wireless relay device 20 receives the message containing the access information of the wireless relay device 20, the wireless relay device 20 may delete or ignore the corresponding message.

Thereafter, the processing unit 13 processes pairing with the service device 30 accessing the wireless relay device 20 based on the access information (for example, the SSID/PW) of the wireless relay device 20 in steps S25 and S26.

At this time, the processing unit 13 may process pairing with the service device 30 by transmitting a response message of the pairing message received from the service device 30 in a unicast type.

The pairing message received by the service device 30 may contain device identification information (for example, MAC or Serial) of the service device 30, and the response message may contain access information (for example, IP or Port) of a service server (not shown) to which the service device 30 accesses.

The operation flow of the user terminal 10 according to an embodiment of the present disclosure has been described above and the operation flow of the service device 30 will next be described below.

Figure 8:
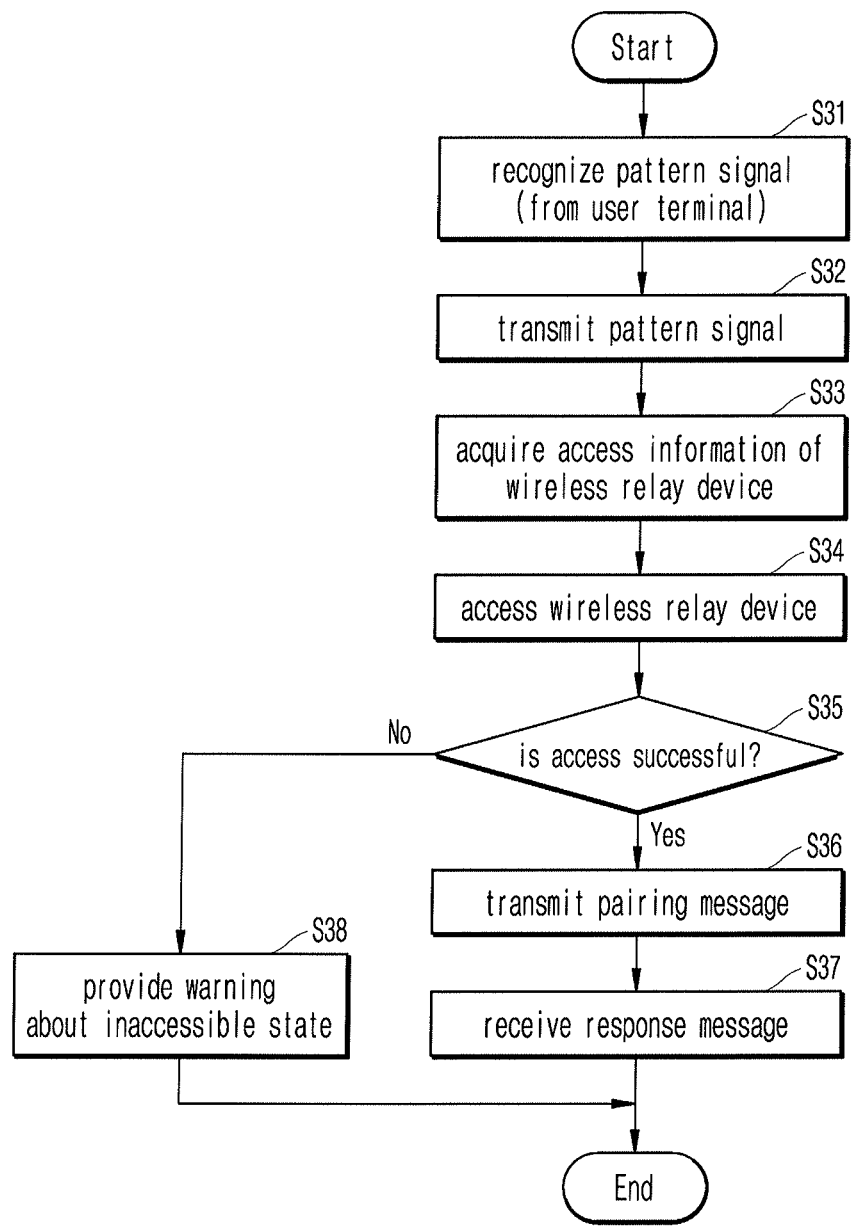
FIG. 8 is a flowchart schematically illustrating the operation flow of a service device in one form of the present disclosure.

FIG. 8 illustrates the operation flow of the service device 30 according to an embodiment of the present disclosure.

First, when the user terminal 10 transmits a predefined pattern signal to the wireless relay device 20 and thus the pattern signal is recognized from the coverage of the wireless relay device 20 in step S31, the transmission unit 31 may transmit (for example, broadcast) the recognized pattern signal in step S32 and the user terminal 10 may identify the transmitted pattern signal.

In connection with this, as pairing with the service device 30 is requested, the user terminal 10 may transmit the predefined pattern signal to the wireless relay device 20 and thus the service device 30 located within the coverage of the wireless relay device 20 may recognize the pattern signal. Further, when it is identified that the same pattern signal is transmitted from the service device 30 having recognized the pattern signal, the user terminal 10 may identify that the service device 30, which is a counterpart to be paired, is located within the coverage of the wireless relay device 20.

Then, the acquisition unit 32 acquires the access information (for example, the SSID/PW) of the wireless relay device 20 transmitted by the user terminal 10 through the communication unit 2310 in step S33.

In connection with this, when it is identified that the service device 30 is located with the coverage of the wireless relay device 20 according to reception of the pattern signal, the user terminal 10 may transmit an access message containing the access information (for example, the SSID/PW) of the wireless relay device 20 to the service device 30.

In other words, the user terminal 10 transmits the message containing access information of the wireless relay device 20 to the wireless relay device 20 and thus allows the service device 30 to acquire the transmitted message from the coverage of the wireless relay device 20.

As described above, the access message transmitted to the wireless relay device 20 may contain access information (for example, an IP or Port) of the user terminal 10 as well as the access information (for example, the SSID/PW) of the wireless relay device 20, and the message may be transmitted while being encrypted according to a predetermined encryption scheme arranged between the user terminal 10 and the service device 30.

Further, when the access information (for example, the SSID/PW) of the wireless relay device 20 is received through the coverage of the wireless relay device 20 in step S34, the processing unit 33 accesses the wireless relay device 20 based on the access information (for example, the SSID/PW) and processes pairing with the user terminal 10 in steps S34 to S37.

At this time, the processing unit 33 may transmit a pairing message to the user terminal 10 through the communication unit 2310 in a unicast type and receive a response message thereof from the user terminal 10 through the communication unit 2310, thereby processing pairing with the user terminal 10.

The pairing message may contain device identification information (for example, MAC or Serial) of the service device 30, but the response message may contain access information (for example, IP or Port) of a service server (not shown) to which the service device 30 accesses.

As described above, after accessing the wireless relay device 20, the processing unit 33 may transmit the pairing message in a unicast type based on the access information (for example, the IP or Port) of the user terminal 10 transmitted together with the access information (for example, the SSID/PW) of the wireless relay device 20 through the coverage of the wireless relay device 20, thereby increasing a pairing success rate compared to the conventional method that complies with a User Datagram Protocol (UDP)-based broadcasting method.

Meanwhile, when access to the wireless relay device 20 using the access information (for example, the SSID/PW) is impossible in step S35, the warning unit 34 may provide a warning about the inaccessible state through, for example, a prepared I/O means (for example, an LED, a display, a speaker, or a buzzer) in step S38, so that the user may recognize the inaccessible state.

The access to the wireless relay device 20 may be impossible in the case in which password information within the access information (for example, the SSID/PW) is wrong like the case in which the user inputs incorrect password information during a user configuration process processed by the user terminal 10.

As described above, according to the operation flow of each element within the pairing system according to an embodiment of the present disclosure, a user configuration process required for a pairing procedure between the user terminal 10 and the service device 30 via the wireless relay device 20 may be minimized to input of password information of the wireless relay device 20, so that user convenience in using the service device 30 can be improved.

The implementations of the functional operations and subject matter described in the present disclosure may be realized by a digital electronic circuit, by the structure described in the present disclosure and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

Implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should not be understood that the operations are performed in the shown specific sequence or that all shown operations are performed in order to obtain a preferable result. In a specific case, a multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A user terminal comprising:
a processor configured to pair with a service device; and
a memory configured to store processor-readable instruction that, when executed by the processor, cause the processor to:
identify whether the service device is located within a coverage of a wireless relay device by transmitting a pattern signal from the user terminal to the wireless relay device;
determining whether the service device is located within the coverage of the wireless relay device by detecting the pattern signal transmitted from the service device responsive to transmitting the pattern signal from the user terminal;
access information regarding the wireless relay device being delivered to the service device responsive to determining that the service device is located within the coverage of the wireless relay device; and
pair with the service device responsive to the service device receiving the information regarding the wireless relay device.

2. The user terminal of claim 1, wherein the pattern signal includes a particular binary value repeated for a predetermined number of times.

3. The user terminal of claim 1, wherein the memory configured to store the processor-readable instructions that, when executed by the processor, cause the processor to:
transmit, to the wireless relay device, the information regarding the wireless relay device; and
transmit the information regarding the wireless relay device to the service device located within the coverage of the wireless relay device.

4. The user terminal of claim 1, wherein the memory is configured to store the processor-readable instructions that, when executed by the processor, cause the processor to:
transmit a response message corresponding to a pairing message responsive to receiving the pairing message from the service device via the wireless relay device; and
pair with the service device responsive to transmitting the response message.

5. The user terminal of claim 4, wherein the pairing message is received from the service device in a unicast manner.

6. A service device comprising:
a processor configured to pair with a user terminal; and
a memory configured to store processor-readable instructions that, when executed by the processor, cause the processor to:
transmit a pattern signal to the user terminal responsive to receiving the pattern signal from the user terminal via a wireless relay device;
receive access information of the wireless relay device transmitted by the user terminal receiving the pattern signal;
determining whether access the wireless relay device is possible based on the access information of the wireless relay device;
pair with the user terminal responsive to determining that the access to the wireless relay device is possible based on the access information; and
provide a warning about an inaccessible state responsive to determining that the access to the wireless relay device is not possible based on the access information.

7. A method of operating a user terminal, the method comprising:
identifying whether a service device is located within a coverage of a wireless relay device by transmitting a pattern signal from the user terminal to a wireless relay device;
determining whether the service device is located within the coverage of the wireless relay device by detecting the pattern signal transmitted from the service device responsive to transmitting the pattern signal from the user terminal;
transferring, to the service device, access information of the wireless relay device responsive to determining that the service device is located within the coverage; and
pairing with the service device responsive to the service device receiving the access information of the wireless relay device.

8. The method of claim 7, wherein the pattern signal includes a particular binary value repeated for a predetermined number of times.

9. The method of claim 7, wherein delivering access information of the wireless relay device to the service device comprises:
transmitting the access information of the wireless relay device to the wireless relay device; and
transmitting the access information of the wireless relay device to the service device located within the coverage of the wireless relay device.

10. The method of claim 7, further comprising pairing with the service device by:
transmitting a response message corresponding to a pairing message responsive to receiving the pairing message from the service device via the wireless relay device; and
pairing with the service device responsive to transmitting the response message.

11. The method of claim 10, wherein the pairing message is received from the service device in a unicast manner.

* * * * *